United States Patent [19]
Tan et al.

[11] Patent Number: 5,529,814
[45] Date of Patent: Jun. 25, 1996

[54] METHOD OF PRODUCING EXCHANGE COUPLED MAGNETIC THIN FILMS WITH POST-DEPOSITION ANNEALING

[75] Inventors: Minshen Tan, Fremont; Hua-Ching Tong; Swie-In Tan, both of San Jose, all of Calif.

[73] Assignee: Read-Rite Corporation, Milpitas, Calif.

[21] Appl. No.: 547,694

[22] Filed: Oct. 19, 1995

[51] Int. Cl.[6] .................................................. B05D 1/02
[52] U.S. Cl. ...................... 427/547; 204/192.2; 427/130; 427/131; 427/132; 427/383.1; 427/404; 427/419.2; 427/598

[58] Field of Search .................................. 427/131, 404, 427/132, 419.2, 130, 383.1, 547, 598; 204/192.2

Primary Examiner—Bernard Pianalto
Attorney, Agent, or Firm—Nathan N. Kallman

[57] ABSTRACT

Exchange coupled magnetic thin films are produced by depositing an antiferromagnetic layer, followed by deposition of a layer of ferromagnetic material on the antiferromagnetic layer. The composite antiferromagnetic/ferromagnetic structure is then annealed at an elevated temperature for a predetermined length of time. This process results in considerably higher exchange coupling fields than obtainable before. Alternatively, the antiferromagnetic layer may be annealed prior to deposition of the ferromagnetic layer.

7 Claims, 2 Drawing Sheets

METHOD OF PRODUCING EXCHANGE COUPLED MAGNETIC THIN FILMS WITH POST-DEPOSITION ANNEALING

FIELD OF THE INVENTION

This invention relates to magnetic thin films and in particular to the preparation of exchange coupled magnetic thin films.

DESCRIPTION OF THE PRIOR ART

The manufacture and use of exchange coupled thin films in thin film magnetoresistive (MR) transducers for magnetic biasing and noise suppression is well known. Such films usually involve an antiferromagnetic (AFM) layer on which is deposited a ferromagnetic (FM) layer, with exchange coupling occurring between the deposited layers, or vice versa. A publication entitled *Exchange Anisotropy in Coupled Films of $Ni_{81}Fe_{19}$ With NiO and $Co_x$ and $Co_xNi_{1-x}$* 0, Applied Physics Letters, Volume 60, Number 24, Jun. 15, 1992, page 3060, M. J. Carey et al, describes the fabrication of exchange coupled films employing heating of the deposition substrate during the deposition process in an effort to increase the exchange field $H_{ex}$. The exchange field is defined as the amount, expressed in Oersteds (oe), by which the hysteresis loop is shifted away from the zero field axis as a result of the coupling between the antiferromagnetic (AFM) and ferromagnetic FeM layers. This publication indicates that to obtain exchange coupling between the (AFM) NiCo—O and (FeM) NiFe, substrate heating during deposition is needed. This is primarily because the substrate heating facilitates the growth of NiCo—O [111] texture, which in turn helps the interfacial exchange interaction with NiFe, which prefers to grow along [111].

SUMMARY OF THE INVENTION

The present invention involves the fabrication of exchange coupled magnetic thin films in which an AFM layer is first deposited, followed by deposition on the deposited AFM layer of an FM layer. The composite AFM/FM layer is then annealed at a suitable temperature and for an appropriate length of time. This process results in a substantial increase in the exchange coupling $H_{ex}$ in the completed structure. As an alternate, the AFM layer may be annealed following deposition, followed by deposition of the FM layer. The advantages of the present invention include the capability of heat treating multiple samples in one run, and the ability to re-orient the films' magnetic anisotropy at will. This bilayer thin film structure is suitable for application in spin-valve type high density magnetic recording transducers as well as in exchange bias in MR transducers.

DESCRIPTION OF THE PREFERRED EMBODIMENT

The $H_{ex}$ is a function of ferromagnetic material thickness. It is preferred for this invention to use NiFe with a thickness of 200 Angstroms (Å). The exchange coupling strength of deposited NiCo—O/NiFe films varies considerably, ranging from virtually no exchange coupling to about 30–35 Oe, with the coercivities of the films being larger than that of pure NiFe.

The films of this invention may be deposited in an RF sputtering system, for example. The antiferromagnetic material employed is preferably NiCo—O with a thickness of 200 Å to 500 Å. The NiCo—O is reactively sputtered from a NiCo alloy target by an $Ar/O_2$ plasma, with a substrate bias from 250–300 V. The NiCo—O retains the same Ni:Co ratio as that of the alloy target, as indicated by energy dispersion spectrum (EDS) studies on a scanning electron microscope. Annealing is then performed on the deposited AFM/FM structure at a temperature ranging from 175° C. to 320° C. and for a period of about 2 hours.

Exchange coupling of different magnitudes has been observed in all the annealed samples fabricated in accordance with this invention. Exchange coupling strength generally increases monotonically with annealing temperatures in the observed 150° C. to 320° C. range. With post-deposition annealing of the AFM/FM films in a magnetic field at temperatures at about 320° C., the exchange coupling field $H_{ex}$ can reach as high as 86 Oe.

The ferromagnetic NiFe films are deposited without any bias and at a different power level than that employed for depositing the NiCo—O films. The NiFe films can be deposited on the NiCo—O layer either in the same vacuum chamber pumpdown as used for the NiCo—O layer, or later in a separate pumpdown after the NiCo—O films have been exposed to the atmosphere, since there is no concern about oxidation of the NiCo—O films. The deposition of the NiFe layer is preferably performed at a power level lower than that employed for deposition of the NiCo—O layer to prevent a disordering of the NiCo—O surface by high power bombardment. This reduced power level reduces or eliminates any disruption of the interface between the two films during deposition. Deposition of the (FM) NiFe film has to be done in the presence of a magnetic field to assist in giving magnetic direction for orientation of the final pinning status. The present invention makes it possible to process the NiCo—O layer and the subsequent metal layers in different systems, thus increasing the target alternatives in the metal deposition processes.

Figure 1:
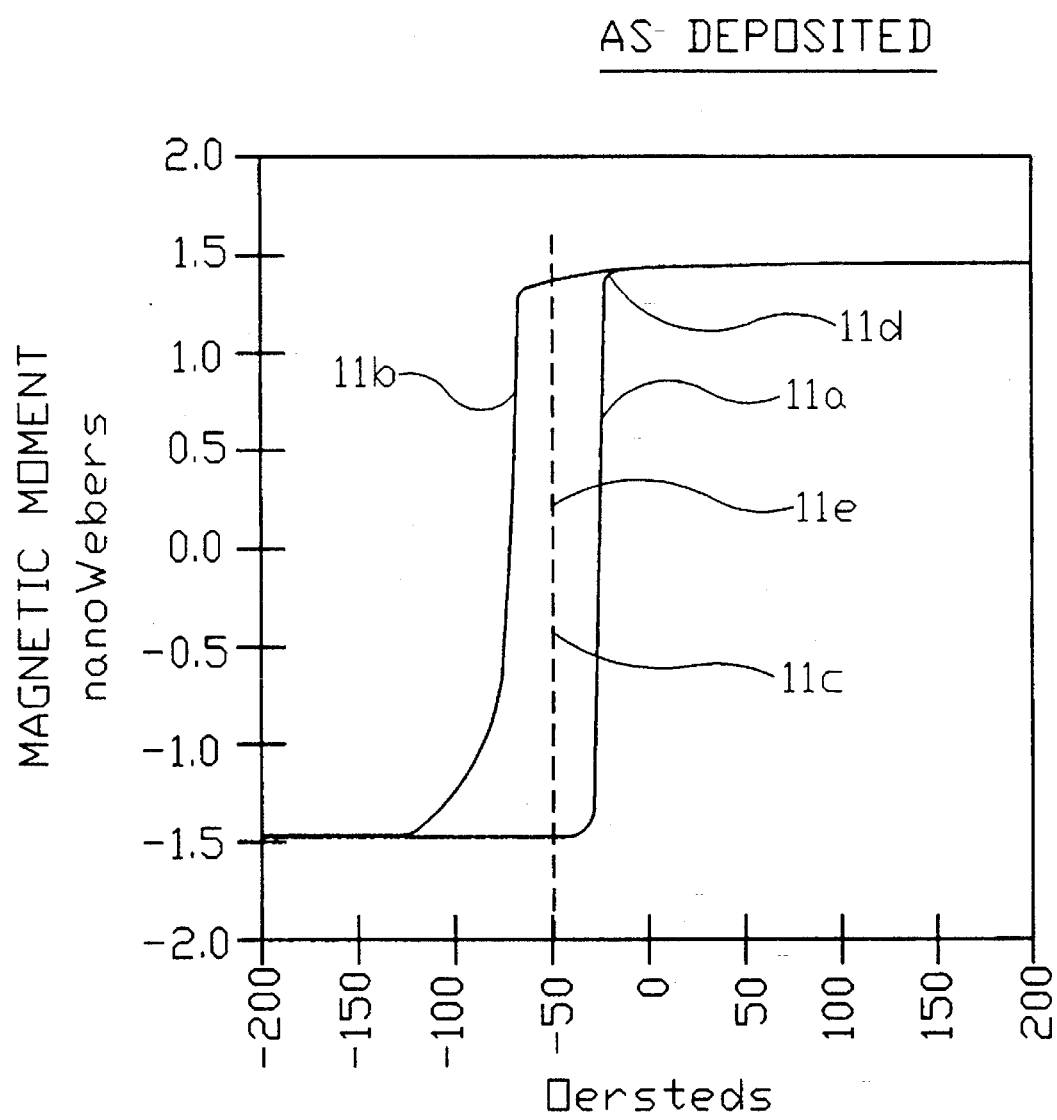
FIG. 1 is a graph showing the exchange coupling characteristics of a structure not involving annealing.
Figure 2:
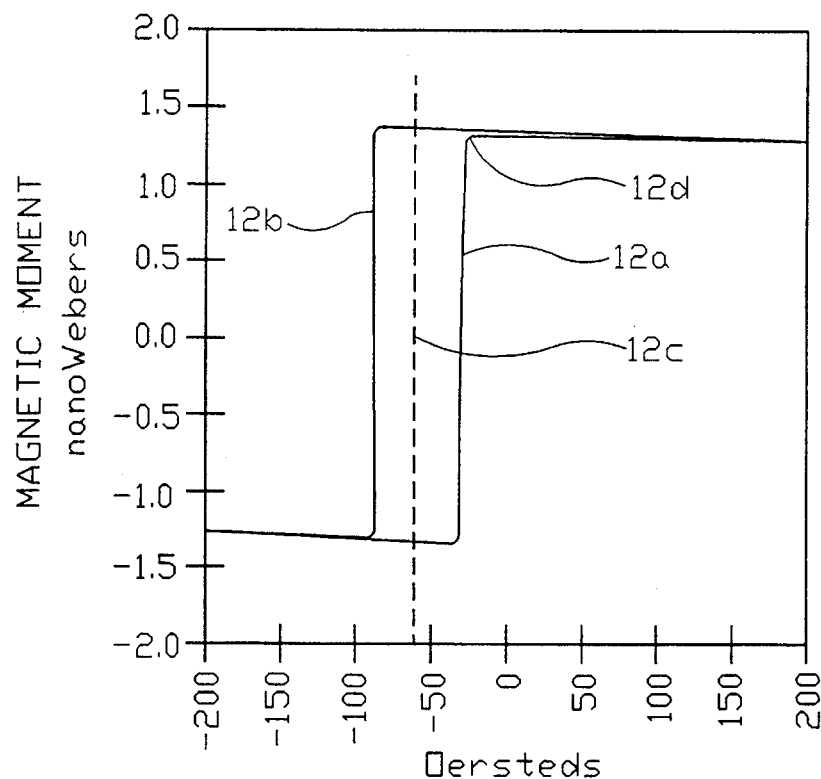
FIG. 2 is a graph of the exchange coupling characteristics of a structure in accordance with the present invention after annealing at a given temperature.
Figure 3:
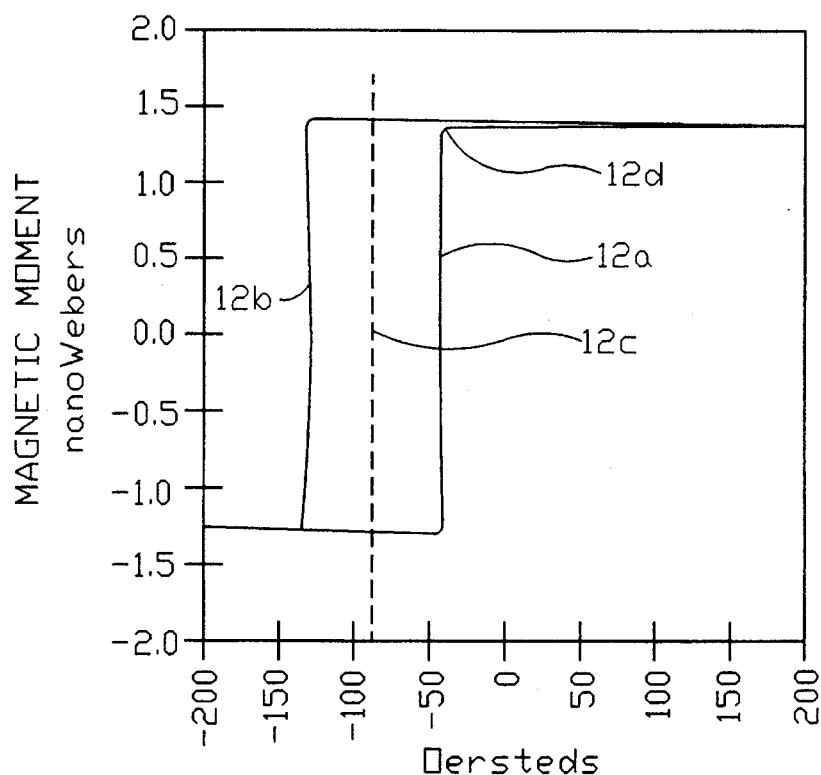
FIG. 3 is a graph of the exchange coupling characteristics of a structure in accordance with the present invention in which the annealing was performed at a higher temperature than that employed in the sample of FIG. 2.

The graph of FIG. 1 illustrates the magnetization curve for a process which does not employ annealing, with magnetic field strength in Oersteds plotted against the magnetic moment in nanowebers. In FIGS. 1, 2 and 3, the exchange coupling field strength $H_{ex}$ may be defined as the midpoint value in Oersteds between the upward rising portions of the hysteresis loop and the downward extending portions thereof. The sample tested comprised a (AFM) NiCo—O layer on which was deposited a (FM) NiFe layer, with no annealing. In the process represented in FIG. 1, the exchange coupling field $H_{ex}$ was measured at 36.14 Oersteds, as shown by dotted line 11c at the midpoint between upwardly rising portion 11a and downwardly extending portion 11b.

The graph of FIG. 2 shows the hysteresis loop for a sample processed in accordance with the present invention. The sample of FIG. 2 was fabricated as described above to produce a structure of NiCo—O with a layer of NiFe deposited thereon followed by annealing at a temperature of 250° for 2 hours. The midpoint between upwardly rising portion 12a and downwardly extending portion 12b, represented by dotted line 12c, resulted in an exchange coupling field $H_{ex}$ value of 62.51 Oersteds.

The graph of FIG. 3 shows the results of the treatment of a sample of an AFM/FM structure of NiCo—O/NiFe which was annealed for 2 hours at a temperature of approximately 320° C. This process resulted in the sample having an exchange coupling field strength $H_{ex}$ of 86.23 oersteds, as shown by dotted line 13c between curves 13a, 13b.

An important aspect of the present invention is the production of a sharp reversal of direction of the magnetic moment at the knee or flex portion of the magnetization curve. This is shown at knee portion 12d of curve portion 12a in FIG. 2 and in knee portion 13d of curve portion 13a in FIG. 3, where the value of the magnetic moment vector has a sharply defined reversal. This is in contrast to the gradual change of slope, without a reversal of direction, at the knee 11d in the prior art curve 11a of FIG. 1.

Although the test data described herein was obtained with (AFM) NiCo—O material and (FM) NiFe material, it will be apparent that other materials may be employed, such as Co, NiCoFe as ferromagnetic materials.

The present invention permits annealing to be performed simultaneously on a number of wafers in a batch process, rather than requiring the individual heating of samples during deposition as in the prior art publication discussed above. Further, with this invention the pinning direction of the films can be reoriented as desired during the annealing step by control of both the annealing temperature and applied field direction.

What is claimed is:

1. A method of producing exchange coupled magnetic films comprising the steps of
   depositing an antiferromagnetic layer on a substrate;
   depositing a ferromagnetic layer on said deposited antiferromagnetic layer; and
   annealing said deposited antiferromagnetic and ferromagnetic layers, said step of annealing being performed at a temperature between 175°–320° Centigrade.

2. A method in accordance with claim 1 in which said step of depositing an antiferromagnetic layer comprises providing a NiCo oxide.

3. A method in accordance with claim 1 in which said step of depositing a ferromagnetic layer comprises providing NiFe.

4. A method in accordance with claim 1 in which said deposition of said ferromagnetic layer is performed in the presence of a magnetic field.

5. A method in accordance with claim 1 in which said antiferromagnetic layer and said ferromagnetic layer are deposited by sputtering at different power levels.

6. A method in accordance with claim 1 including the additional step of annealing said antiferromagnetic layer prior to deposition of said ferromagnetic layer.

7. A method in accordance with claim 1 in which said annealing is performed for about 2 hours.

* * * * *